Oct. 16, 1956

G. D. RITTER 2,767,274

STARTING WINDING MECHANISM FOR ELECTRIC MOTOR

Filed Sept. 2, 1953

INVENTOR.
GEORGE D. RITTER
BY William Cleland

ATTORNEY

Oct. 16, 1956 G. D. RITTER 2,767,274
STARTING WINDING MECHANISM FOR ELECTRIC MOTOR
Filed Sept. 2, 1953 3 Sheets-Sheet 2
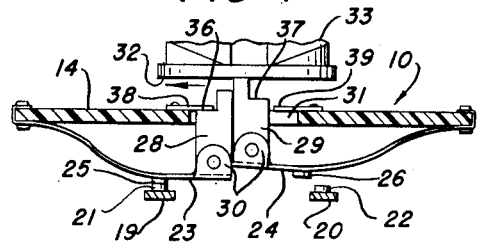
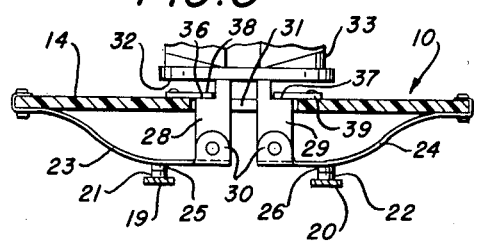
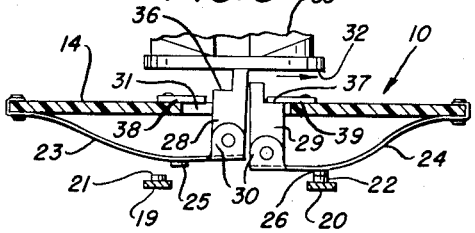
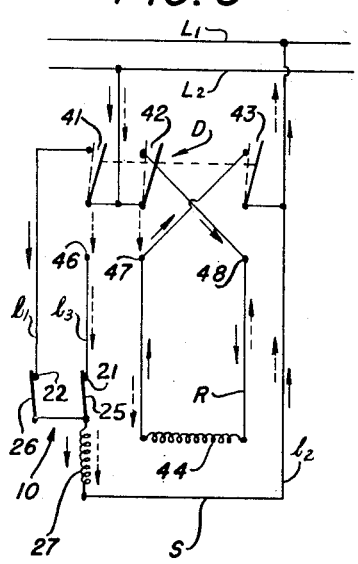
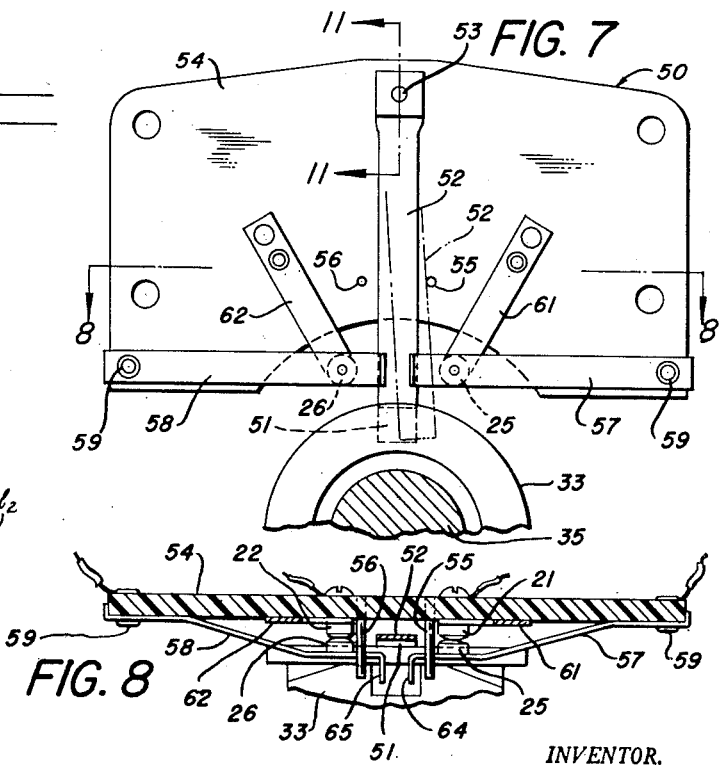
INVENTOR.
GEORGE D. RITTER
BY William Cleland
ATTORNEY Oct. 16, 1956  G. D. RITTER  2,767,274
STARTING WINDING MECHANISM FOR ELECTRIC MOTOR
Filed Sept. 2, 1953  3 Sheets-Sheet 3
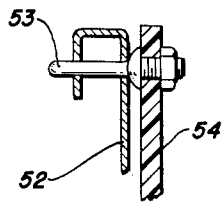
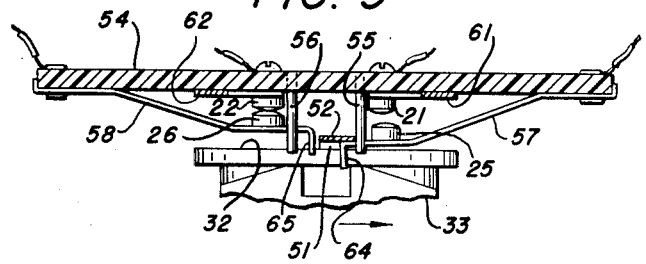
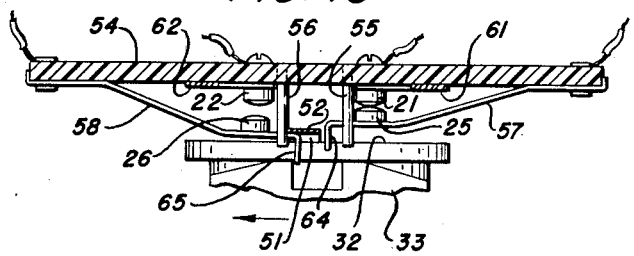
INVENTOR.
GEORGE D. RITTER
BY
William Cleland
ATTORNEY United States Patent Office 2,767,274
Patented Oct. 16, 1956

2,767,274

STARTING WINDING MECHANISM FOR ELECTRIC MOTOR

George D. Ritter, Uniontown, Ohio

Application September 2, 1953, Serial No. 378,010

4 Claims. (Cl. 200—80)

This invention relates to alternating current single-phase electric motors of the instant reversing type, and more particularly relates to the starting winding mechanisms and circuits thereof.

The invention has particular application to electric motors of the type used for operating garage or like doors and hoisting equipment, the same having running and starting windings, and a speed-responsive starting winding switch adapted to deenergize the starting winding when the motor has accelerated sufficiently. Heretofore, such motors have had the running and starting windings in two separate circuits, each having two terminals for external connection to a reversing controller operable for reversing the polarity of one winding in relation to the other. They have, however, required the use of an auxiliary mechanism, such as a reversing relay having contacts connected to by-pass contacts in the starting winding switch, adapted to reverse the operation of the motor while running at speeds in excess of that at which said starting winding contacts are opened. In capacitor-start motors a condenser or capacitor is also connected in series with the starting winding.

A primary object of the present invention is to provide, in a motor of the type mentioned, a simple, inexpensive, and dependable starting winding switch and controlling means by which magnetic torque of the motor may be instantaneously reversed at any operating speed of the same, without use of known types of reversing relays or similar auxiliary means.

Another object of the invention is to provide a starting winding switch and circuit of the character described which may be controlled by a simple three-pole, double-throw drum controller or its electrical equivalent.

Another object of the invention is to provide a starting switch mechanism which has a minimum of sliding parts to wear out and which is of such compact structure that it may be easily mounted within the housing of a fractional horsepower motor.

Another object of the invention is to provide an improved switch of the character described which will operate effectively in conjunction with conventional types of centrifugal mechanisms.

Other objects of the invention will be manifest from the following brief description and the accompanying drawings.

Of the accompanying drawings:

Figure 3 is a horizontal cross-section, partly broken away, taken substantially on the line 3—3 of Figure 2, showing a front elevation of the improved switch also in the inoperative condition.

Figure 4 is a view similar to Figure 3, but showing the switch in condition resulting upon clockwise rotation of the motor shaft as considered from the right of Figure 1.

Figure 5 is a view similar to Figure 4, but illustrating the switch in condition resulting upon reverse or counter-clockwise operation of the motor shaft.

Figure 6 is a schematic diagram of a wiring circuit for starting and operating the motor through the improved switch.

Figure 7 is an enlarged elevation corresponding to Figure 2, illustrating a modified form of switch mechanism, viewed with respect to the motor as the switch mechanism would appear in direction opposite to the lines 2—2 of Figure 1.

Figure 8 is a cross-section taken substantially on the line 8—8 of Figure 7, showing the switch in an inoperative position.

Figure 9 is a fragmentary cross-section corresponding to a portion of Figure 8, illustrating the switch mechanism in a condition of operation occurring when the motor shaft is turning in clockwise direction.

Figure 10 is a view like Figure 9 showing an opposite condition of operation occurring when the motor shaft is driven in counter-clockwise direction.

Figure 11 is a fragmentary cross-section taken on the line 11—11 of Figure 7.

Figure 1:
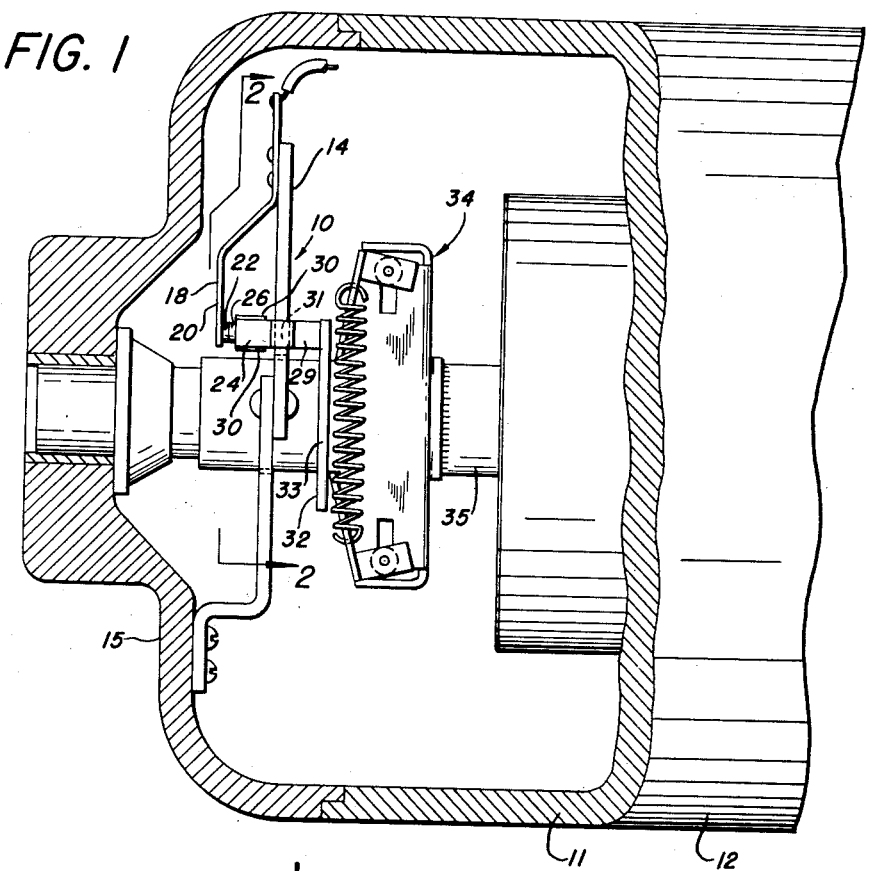
Figure 1 is a partial side elevation, partly broken away and in section, of an electric motor having incorporated therein a centrifugal starting switch embodying the features of the invention in inoperative condition.
Figure 2:
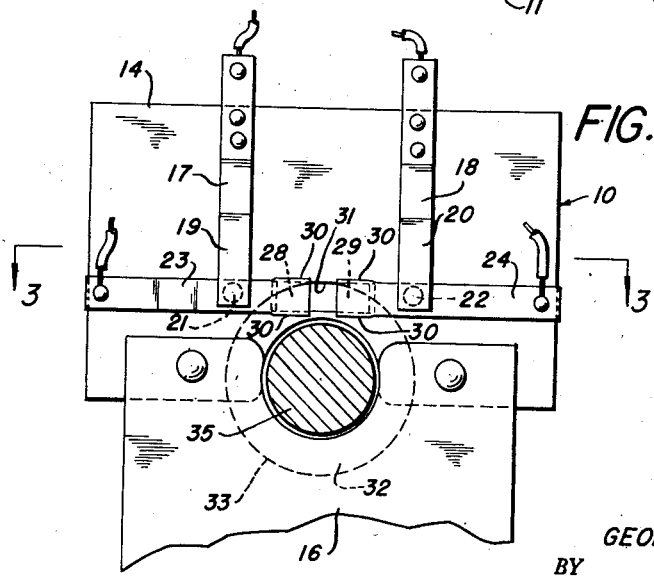
Figure 2 is a vertical cross-section, partly broken away, taken substantially on the line 2—2 of Figure 1.

Referring first to the form of the invention shown in Figures 1 to 6, and in particular to Figures 1 to 3, the numeral 10 designates generally a centrifugal switch embodying the features of the invention, suitably mounted within the housing 11 of a reversing type motor 12. The improved switch will operate effectively in an inductively split-phase, single phase induction motor, a capacitor-start induction motor, or in a capacitor-start dual-voltage motor. The invention will be described in connection with a split-phase induction motor circuit as shown in Figure 6.

The switch 10 includes a dielectric backing plate 14, rigidly supported in the motor casing 15 by a mounting bracket 16 attached to the motor housing. Fixed on the front or outer face of plate 14 may be a pair of laterally spaced electro-conductive contact elements 17 and 18, having relatively inflexible downwardly extending portions 19 and 20 in outwardly spaced relation to the outer face of the plate, and having inwardly presented contact points 21 and 22 fixed on the lower ends thereof. A pair of flat spring contact elements 23 and 24 of electro-conductive material are arched freely inwardly from laterally opposite outer edges of the backing plate, and have contact points 25 and 26 near the free ends thereof yieldingly engaged with the contact points 21 and 22, respectively, in the normal inoperative condition best shown in Figure 3, the pairs of contacting points 21, 25 and 22, 26 being arranged in parallelism in a starting winding circuit S at one side of a starting winding 27 (see Figure 6) as will be described in more detail later.

For yieldingly holding said pairs of contact points in the aforementioned closed condition, fingers 28 and 29 of rigid dielectric material are pivotally attached to the inner ends of the spring contact elements 23 and 24, as between bifurcations 30, 30 to extend rearwardly in a horizontal plane, through a laterally extending guide slot 31 in the central portion of the backing plate 14, inner ends of the fingers 28 and 29 being engaged by a flat outwardly presented, annular face 32 of an annular shoe 33 of dielectric material, which shoe is a centrifugally actuated part of a conventional rotary member 34 mounted to rotate with motor shaft 35 (see Figures 2 and 3). In other words, when the motor 12 is not running the shoe 33 is spring-pressed into yielding contact with the inner ends of the fingers 28 and 29 to hold said pairs of contact points closed, as described, but when the motor is operated to rotate the rotary member toward a predetermined relatively high, normal speed it will be centrifugally actuated to move the shoe 33 axially inwardly, with results to be described. Each finger 28 and 29 is reduced in width for a substantial distance outwardly from the inner ends thereof, to provide inwardly presented shoulders 36 and 37 on the laterally outward side edges thereof, adapted to be in releasable stop engagement behind laterally presented edges of stop plates 38 and 39 overhanging the outer ends of the slot 31, said stop plates being secured to the inner face of backing plate 14. The arrangement is such that rotation of the shoe 33 in a clockwise direction with shaft 35, as indicated by the arrow in Figure 4, while centrifugally actuated to move the same axially inwardly, the finger 28 will be moved to locked engagement with its locking plate 38 in which the contact points 21 and 25 are held closed, while the finger 29 is moved laterally away from similar locking engagement with its locking plate 39, by its initial frictional engagement with shoe 33, and is subsequently allowed to be yieldingly urged axially inwardly by the inherent tendency of spring contact element 24 to resume a given shape in which the contact points 22 and 26 are in spaced apart, open condition (see Figure 4). The fingers 28 and 29 are arranged and proportioned with respect to each other and the stop plates 38 and 39 so that only one finger at a time may pass inwardly of slot 31, past the plates 38 and 39. Thus, as long as the motor continues running at predetermined speed the contact points 22 and 26 will remain open, while contact points 21 and 25 are locked closed.

Conversely, when the motor 12 is reversely operated the shoe 33 will correspondingly rotate in counter-clockwise direction, as indicated by the arrow in Figure 5, to open the contacts 21, 25 and close contacts 22, 26, and maintain the same in such condition until the motor is stopped or again forwardly operated.

The operation of the centrifugal switch of Figures 1 to 5 will be best understood by a description thereof in connection with the wiring diagram of Figure 6, which includes a main or running winding circuit R operated from power lines $L_1$ and $L_2$ of a single-phase power supply through a portion of a three-pole, double-throw switch D, which may be either manually or magnetically operated, and also includes an auxiliary or starting winding circuit S operated from said power lines $L_1$ and $L_2$ in parallel to circuit R, through another portion of switch D and centrifugal switch 10.

Referring particularly to Figure 6, the motor 12 is started to rotate the shaft 35 thereof in "forward" or clockwise direction, by throwing the switch D to close contact 41 in the starting winding circuit S and contacts 42 and 43 in the running winding circuit R (see dotted positions of contacts). Thus, current is supplied to the running winding 44 across lines $L_1$ and $L_2$, through contacts 42 and 43, simultaneously with current being supplied from line $L_2$, through closed contact 41, a line $l_1$, closed contacts 22, 26, to one side of starting winding 27, and a line $l_2$ from the other side of the starting winding to line $L_1$. In other words, the current is initially supplied in the parallel circuits S and R, as indicated by full line arrows in Figure 6, to energize both windings 27 and 44 to start and accelerate the motor with booster power.

As soon as the motor is operated toward predeterminately full speed, however, the rotary member 34 will be actuated by centrifugal force to move the pressure shoe 33 axially inwardly, as viewed in Figure 1, and because the shoe is then being rotated in clockwise or forward direction with shaft 35, finger 28 will have been initially moved to locked position behind locking plate 38 to hold the contacts 21 and 25 closed (Figure 4), while the finger 29 is, by continued frictional engagement of the pressure shoe 33, held out of locking engagement with its locking plate 39, thereby to allow the resiliency of element 26 to open the contacts 22, 26 (see Figure 4) and deenergize the starting winding. This last described condition will be maintained as long as the motor is kept running in forward direction at full speed by the running winding.

The magnetic torque of the running winding 44 of motor 12 may be instantly reversed by throwing the three-pole switch D to open the contacts 41, 42 and 43 and close corresponding contacts 46, 47 and 28. This supplies reversed operating current to the running winding 44 in circuit R across the power lines $L_1$ and $L_2$, through the contacts 47 and 48, simultaneously with current being supplied from line $L_2$ through the now closed contact 46, line $l_3$, closed contacts 21, 25, to said one side of the starting winding 27, and the said line $l_2$ from the other side of the starting winding to line $L_1$. That is, in reversing the magnetic torque the motor is rapidly decelerated, and when the R. P. M. is reduced to twenty to fifty percent of synchronous speed the centrifugal mechanism will operate reversely, thus closing contacts 22 and 26, the starting winding, however, remaining energized through line $l_3$, as just described, but the instant zero speed is reached the motor will start to accelerate in counter-clockwise direction until the starting winding is deenergized. The direction of the current supply which reverses the motor is indicated by dotted-line arrows in the running winding circuit R of Figure 6, while similar dotted arrows show the change in course of the current in starting winding circuit S.

As before, when the motor has gained full momentum under reverse power, the governor 34 will have been actuated by centrifugal force to move pressure shoe 33 axially inwardly (Figure 1), and rotation of the shoe in resultant counter-clockwise direction (with shaft 35) against the end of finger 28 initially will have moved the finger 29 into locked engagement with plate 39 to hold the contacts 22, 26 closed (see Figure 5), while the finger 28 will have been moved axially inwardly and laterally away from locking engagement with its locking plate 38, thereby to open the contacts 21 and 25 and deenergize the starting winding. Here again the last-named condition will be maintained as long as the motor is running in reverse.

In either the forward or reverse operation of motor 12, opening of switch D as shown in full lines in Figure 6 to stop the motor, will cause the centrifugal rotary member 34 to resume its normal inoperative condition, in which the shoe 33 will be spring-urged axially outwardly, in turn urging the fingers 28 and 29 to maintain the contacts 21, 25 and 22, 26 of switch 10 normally closed, as shown in Figures 3 and 6.

Figures 7 to 11 illustrate a modified form of centrifugally actuated starting winding switch 50 which otherwise operates in the motor circuit of Figure 6 substantially as described above, like parts being given like numerals unless otherwise noted.

In this modified structure the annular face 32 of the dielectric pressure shoe 33 (see Figure 8 in conjunction with Figure 1), in the normal or inoperative condition of motor 12, engages a block 51 on the lower end of a locking arm 52 of flat springy metal pivoted at its upper end, as indicated at 53, to depend freely from the dielectric backing plate 54. The backing plate is adapted to be rigidly supported in the motor housing 11 in a manner similar to plate 14 in Figure 1. Stop pins 55 and 56 on the inner face of plate 54 limit lateral free outward swinging movement of arm 52. This yielding engagement of shoe 33 with arm 52 holds the same depressed or flexed axially outwardly toward plate 54, and in this relative position a pair of flat spring contact elements 57 and 58 extend freely oppositely inwardly from fastening means 59, 59 at laterally opposite sides of plate 54 to adjacent the center thereof, to have contact points 25 and 26 on the inner faces of elements 57 and 58, respectively, in closed or contacting relation to a pair of laterally spaced contact points 21 and 22, respectively, of contact bars 61 and 62 secured to the plate 54.

The spring tension of arm 52 is stronger than that of either of the contact elements 57 or 58, in order to have power to urge each contact arm to open position, but this spring tension of arm 52 is insufficient to resist the axial thrust of shoe 33 in the inoperative position of the same.

When the motor 12 is started to rotate shaft 35 in clockwise direction, the rotating shoe 33 frictionally engaging block 51 on arm 52 will pivot the arm to the right as shown in chain-dotted lines in Figure 7, into stop engagement with pin 55, in which position arm 52 will be behind the inner end of spring contact 57 and out of alignment with the inner end of arm 58. Accordingly, when the motor has gained predetermined speed as previously described in conection with Figure 6, the shoe 33 will be urged inwardly away from backing plate 54, allowing resilient arm 52 to flex spring contact element 57 away from engagement of contact point 25 with contact point 21, and as long as the motor is running at said predetermined speed contacts 21, 25 will be locked in open position and contacts 22, 26 will be held in closed position. Thus, temporary actuation of the starting winding 27 (Figure 6) will be the same as previously described in connection with Figures 1 to 5. Conversely, reverse or counter-clockwise operation of the motor will result in the shoe 33 moving the arm 52 to the left as viewed in Figure 7, thereby to set the contacts 21, 25 and 22, 26 in closed and open conditions, respectively, as shown in Figure 10.

For preventing fouling engagement of arm 52 inwardly around the inner ends of contact arms 57 and 58, said inner ends of the contact arms may be inturned, as indicated at 64 and 65.

Thus has been provided an improved starting winding circuit arrangement, with cooperative switch means which is simple and compact in construction, to automatically control the current to a starting winding for starting or instantly reversing an electric motor of the class described.

Other modifications of the invention may be resorted to without departing from the spirit thereof or the scope of the appended claims.

What is claimed is:

1. A dual circuit switch mechanism for use with a speed-responsive rotary member having an axially shiftable rotary shoe, comprising a relatively fixed supporting plate, relatively fixed electrical contact elements having laterally spaced contact points outwardly spaced from an outer face of said plate, a pair of spring-pressed electrical contact arms mounted in spaced relation on said plate to extend freely and having contact points thereon yieldingly engaging the respective said laterally spaced contact points in normal inoperative condition of the switch in use, said plate having opening means therethrough, fingers on the free ends of said contact arms projecting freely through said plate opening means to present ends thereof at the inner side of the plate to be in frictional engagement with said shoe in the normal inoperative condition of the switch, rotation of said shoe in either direction thereby tending to move said fingers in corresponding directions, and locking means operable upon said movement of said fingers in a said corresponding direction to lock one said finger against movement thereof inwardly of said plate, whereby upon inward axial shifting of said shoe by said rotary member the other finger is released from the locking means thereof and thereby to open the corresponding normally engaging contact points.

2. A dual circuit switch mechanism for use with a speed-responsive rotary member having an axially shiftable rotary shoe, comprising a relatively fixed supporting plate, relatively fixed electrical contact elements having laterally spaced contact points outwardly spaced from an outer face of said plate, a pair of spring-pressed electrical contact arms mounted in spaced relation on said plate to extend freely and having contact points thereon yieldingly engaging the respective said laterally spaced contact points in normal inoperative condition of the switch in use, said plate having opening means therethrough, fingers on the free ends of said contact arms projecting freely through said plate opening means to present ends thereof at the inner side of the plate to be in frictional engagement with said shoe in the normal inoperative condition of the switch, rotation of said shoe laterally in either direction thereby tending to move said fingers in corresponding directions, and locking means operable upon said movement of said fingers in a said corresponding direction to lock one said finger against movement thereof inwardly of said plate, whereby upon inward axial shifting of said shoe by said rotary member the other finger is released from the locking means thereof and thereby to open the corresponding normally engaging contact points, said locking means including releasably interengaging portions on each said finger and said plate.

3. A starting-winding switch as for a reversible single-phase motor having a driven shaft and a speed-responsive mechanism including a rotary shoe axially shiftable by changes in centrifugal force and having an annular surface thereon substantially concentric with and in a plane perpendicular to the axis of the shaft of said motor, said switch comprising mounting means, two switches on said mounting means each including an electrical contact means adapted to be in one or other of open and closed positions thereof, a pair of elements each mounted on said mounting means to be individually movable in directions both longitudinally and angularly of said axis, said elements each having an end portion extending freely thereof in direction axially toward said annular surface, means tending to hold said elements toward frictional engagement of said end portion of each said element with said annular surface in various positions of axial adjustment of said shoe, opposite said axial adjustment of the shoe thereby being effective to move said elements between said open and closed positions of the respective said contact means and releasable interengaging means on each of said elements and on said mounting means whereby one element or the other, depending on the direction of angular movement of said elements provided by frictional engagement of said end portions with said annular surface of the rotating shoe, is locked against axial movement of the respective element in direction toward said shoe and whereby said locked element is held out of engagement with said annular surface to set the other said contact means in corresponding position of operation thereof.

4. A starting-winding switch as for a reversible single-phase motor having a driven shaft and a speed-responsive mechanism including a rotary shoe axially shiftable by changes in centrifugal force and having an annular surface thereon substantially concentric with and in a plane perpendicular to the axis of the shaft of said motor, said switch comprising mounting means, two switches on said mounting means each including an electrical contact means adapted to be in one or other of open and closed positions thereof, a pair of elements each mounted on said mounting means to be individually movable in directions both longitudinally and angularly of said axis, said elements each having an end portion extending freely thereof in direction axially toward said annular surface, resilient means tending to hold said elements toward frictional engagement of said end portions of each said element with said annular surface in various positions of axial adjustment of said shoe, opposite said axial adjustment of the shoe thereby being effective yieldingly to move said elements between said open and closed positions of the respective said contact means and releasable interengaging means on each of said elements and on said mounting means whereby one element or the other, depending on the direction of angular movement of said elements provided by frictional engagement of said end portions with said annular surface of the rotating shoe, is locked against axial movement of the respective element in direction toward said shoe and whereby said locked element is held out of engagement with said annular surface to set the other said contact means in corresponding position of operation thereof.

References Cited in the file of this patent

UNITED STATES PATENTS

| | | |
|---|---|---|
| 2,205,787 | Brongersma | June 25, 1940 |
| 2,389,381 | McLennan | Nov. 20, 1945 |
| 2,406,430 | Mason | Aug. 27, 1946 |
| 2,528,845 | Sprague | Nov. 7, 1950 |
| 2,586,734 | Sprague et al. | Feb. 19, 1952 |
| 2,598,440 | Reek | May 27, 1952 |
| 2,683,844 | Schaefer | July 13, 1954 |